(12) United States Patent
Yamaguchi et al.

(10) Patent No.: US 9,108,530 B2
(45) Date of Patent: Aug. 18, 2015

(54) VEHICLE DOOR

(71) Applicants: TS TECH CO., LTD., Asaka-shi, Saitama (JP); HONDA MOTOR CO., LTD., Tokyo (JP)

(72) Inventors: Katsuyori Yamaguchi, Shioya-gun (JP); Keita Ishizaka, Utsunomiya (JP); Hiroshi Sato, Utsunomiya (JP)

(73) Assignees: TS TECH CO., LTD., Saitama (JP); HONDA MOTOR CO., LTD., Tokyo (JP)

( * ) Notice: Subject to any disclaimer, the term of this patent is extended or adjusted under 35 U.S.C. 154(b) by 97 days.

(21) Appl. No.: 13/955,718

(22) Filed: Jul. 31, 2013

(65) Prior Publication Data

US 2015/0035310 A1  Feb. 5, 2015

(51) Int. Cl.
*B60N 3/02* (2006.01)
*B60R 13/02* (2006.01)

(52) U.S. Cl.
CPC ............ *B60N 3/026* (2013.01); *B60R 13/0206* (2013.01); *B60R 13/0243* (2013.01); *B60N 3/02* (2013.01)

(58) Field of Classification Search
CPC .......... B60N 3/026; B60N 2/466; B60N 3/02; B60J 5/0413; B60J 5/0468; B60J 5/0493; B60R 13/0243

USPC ....................... 296/146.7, 152, 153
See application file for complete search history.

(56) References Cited

U.S. PATENT DOCUMENTS

| 5,158,353 | A | * | 10/1992 | Kimisawa | ..................... 362/501 |
| 2007/0214845 | A1 | * | 9/2007 | Gilleo et al. | ..................... 70/208 |
| 2008/0272614 | A1 | * | 11/2008 | Hall et al. | ................. 296/146.7 |
| 2013/0154304 | A1 | * | 6/2013 | Tobey et al. | ............... 296/146.7 |

FOREIGN PATENT DOCUMENTS

| EP | 2479068 A1 | 7/2012 |
| JP | 2012-153224 A | 8/2012 |
| WO | WO2013081070 A1 | * 6/2013 |

* cited by examiner

*Primary Examiner* — Jason S Daniels
(74) *Attorney, Agent, or Firm* — Westerman, Hattori, Daniels & Adrian, LLP (57) ABSTRACT

A vehicle door for use on a vehicle includes a pocket having a side wall assembly that defines a space in the pocket. The side wall assembly includes an inner wall member disposed in a transverse inward direction of the vehicle. A hand grip is bendable with respect to the inner wall member by a bendable web. The hand grip has a front tooth including a support that extends through a front hole, and a locking hook that extends from the support and engages with a lower surface of a front wall of the inner wall member. A front support wall is mounted on the inner wall member for keeping the front tooth from being removed out of the front hole.

10 Claims, 8 Drawing Sheets

VEHICLE DOOR

BACKGROUND OF THE INVENTION

1. Field of the Invention

The present invention relates to a vehicle door having a pocket that opens upwardly on a passenger compartment side of a door body.

2. Description of the Related Art

Heretofore, there have widely been used vehicle doors having a pocket that opens upwardly in a door arm rest of the door body. The pocket has a hand grip bendably connected by a bendable web to an inner wall member, which is positioned in a transverse inward direction of the vehicle, of a side wall assembly that defines a space inside the pocket. The pocket is installed in the door arm rest while the hand grip is closed about the bendable web, which is bent. The driver of the vehicle can easily close the vehicle door by pulling the hand grip with the driver's fingers being placed on the hand grip.

It has been proposed in the art to lock the hand grip in a closed state on the inner wall member by inserting a tooth disposed on the hand grip into a through hole, which is defined in the inner wall member of the side wall assembly of the pocket, and holding the tooth in abutment against a surface, which is contiguous to a wall surface that defines the through hole (see, for example, Japanese Laid-Open Patent Publication No. 2012-153224).

SUMMARY OF THE INVENTION

It is an object of the present invention to provide a vehicle door, which has a hand grip stably held in engagement with an inner portion of a side wall that defines a pocket in a door arm rest of the door body.

According to a first feature of the present invention, there is provided a vehicle door for use on a vehicle, comprising an upwardly open pocket that opens upwardly on a passenger compartment side of a door body, the upwardly open pocket including a side wall assembly defining a space in the upwardly open pocket, and having an inner wall member disposed in a transverse inward direction of the vehicle, a hand grip bendable with respect to the inner wall member by a bendable web, a pair of teeth having a pair of supports disposed respectively on the hand grip and extending through respective through holes defined in the inner wall member when the hand grip is closed with the bendable web in a bent state, and a pair of locking hooks extending respectively from the supports in directions transverse to directions in which the supports extend, the locking hooks being engageable with engagement surfaces contiguous to wall surfaces that define the through holes, respectively, and a pair of retainers mounted on the inner wall member for keeping the teeth from being removed out of the through holes.

According to a second feature of the present invention, the teeth are disposed respectively on opposite ends of the hand grip in a longitudinal direction of the vehicle, and the through holes and the retainers are disposed in association with the teeth.

According to a third feature of the present invention, the retainers engage with respective rear surfaces of the teeth, which face away from the directions in which the locking hooks extend.

According to a fourth feature of the present invention, the teeth have respective protrusions that project from respective rear surfaces of the supports, and which engage respectively with the retainers, the protrusions being narrower than the supports.

According to a fifth feature of the present invention, the teeth are disposed on respective front and rear ends of the hand grip and are effective to keep the hand grip from being displaced with respect to the inner wall member in a longitudinal direction of the vehicle, and the locking hooks extend toward opposite sides from a center portion of the hand grip in the longitudinal direction of the vehicle.

According to a sixth feature of the present invention, the inner wall member has, in a central region thereof in the longitudinal direction of the vehicle, a pressure bearing member, which faces toward the hand grip and bears a load applied to the hand grip in a transverse inward direction of the vehicle.

According to a seventh feature of the present invention, the pressure bearing member comprises a plurality of pressure bearing members disposed on an upper surface of the inner wall member, at least one of the pressure bearing members has a tongue projecting upwardly on an upper surface thereof, and the hand grip has an engaging portion for engaging the tongue, the engaging portion being disposed in a position facing toward the upper surface of the inner wall member.

According to an eighth feature of the present invention, the teeth are disposed on respective opposite ends of the hand grip in the longitudinal direction of the vehicle, the through holes and the retainers are disposed in association with the teeth, and the tongue and the engaging portion are positioned between the teeth.

According to a ninth feature of the present invention, the engaging portion comprises a surface that defines a hole, and the tongue is inserted in the hole.

According to a tenth feature of the present invention, the hand grip has an intermediate tooth positioned between the teeth, and the inner wall member has an intermediate engaging portion for engagement with the intermediate tooth.

According to an eleventh feature of the present invention, the through holes are defined in an upper surface of the inner wall member, the teeth are disposed in positions facing the upper surface of the inner wall member, the retainers have respective surfaces engageable respectively by the teeth, and which are contiguous to wall surfaces defining the through holes, thereby providing flat surfaces, respectively, and the wall surfaces defining the through holes include side surfaces adjacent to the flat surfaces, the side surfaces having heights that are smaller than heights of the flat surfaces.

According to the first feature of the present invention, since the retainers are disposed on the inner wall member for keeping the teeth of the hand grip from being removed out of the through holes, the teeth are kept from becoming dislodged from the inner wall member of the side wall assembly of the pocket. Consequently, the hand grip is locked in a stable condition on the inner wall member.

According to the second feature of the present invention, inasmuch as the teeth are disposed respectively on opposite ends of the hand grip in the longitudinal direction of the vehicle, the hand grip is locked in a highly stable condition on the inner wall member.

According to the third feature of the present invention, since the retainers engage with the respective rear surfaces of the teeth, by means of a simple structure, the teeth are kept from being removed out of the through holes.

According to the fourth feature of the present invention, since the protrusions of the teeth engage respectively with the retainers, when the locking hooks come into engagement with the inner wall member, any sliding resistance developed between the teeth and the retainers is relatively small. Therefore, the locking hooks are easily brought into engagement with the engageable surfaces.

According to the fifth feature of the present invention, since the teeth keeps the hand grip from being displaced with respect to the inner wall member in the longitudinal direction of the vehicle, any load applied to the hand grip in the longitudinal direction of the vehicle is suppressed from being concentrated on the bendable web, which is of relatively small rigidity. In other words, the teeth are effective to protect the bendable web. Further, the teeth are disposed at regions (on ends of the hand grip) that are not easily flexed when loads act in a transverse inward direction of the vehicle on a central region of the hand grip in the longitudinal direction of the vehicle, on which a finger or fingers of a passenger in the vehicle can be placed comparatively easily. Owing thereto, the teeth can advantageously be kept from being pulled out from the through holes. Furthermore, the locking hooks of the teeth extend outwardly toward opposite sides from a center portion of the hand grip in the longitudinal direction of the vehicle, and therefore, the teeth can further be kept from being pulled out from the through holes.

According to the sixth feature of the present invention, the pressure bearing member bears a load applied to the hand grip in the transverse inward direction of the vehicle. Thus, the load is suppressed from being concentrated on the bendable web. In other words, the pressure bearing member is effective to protect the bendable web. Further, because the pressure bearing member is provided at an intermediate portion of the inner wall member in the longitudinal direction of the vehicle, compared to a situation in which such a pressure bearing member is not provided, the bending amount or amount of flexure of the hand grip can be further suppressed, and hence the teeth can effectively be kept from being pulled out from the through holes.

According to the seventh feature of the present invention, at least one of the pressure bearing members has a tongue, which projects upwardly on the upper surface thereof, whereas the hand grip has an engaging portion for engaging the tongue, the engaging portion being disposed in a position confronting the upper surface of the inner wall member. The engaging portion and the tongue, which are held in engagement with each other, are effective to suppress loads applied to the hand grip in the transverse inward direction of the vehicle from being concentrated on the bendable web. Accordingly, the bendable web is protected efficiently.

According to the eighth feature of the present invention, since the teeth are disposed on the respective opposite ends of the hand grip in the longitudinal direction of the vehicle, and the tongue and the engaging portion are positioned between the teeth, the bendable web is protected in a highly efficient manner.

According to the ninth feature of the present invention, when the tongue engages (contacts) the wall surface that defines the hole, the tongue bears a load applied to the hand grip in the transverse inward direction of the vehicle. Thus, during a process of manufacturing the vehicle door or the pocket, a worker can visually confirm the positional relationship between the hole and the tongue, i.e., whether the tongue is inserted in a proper position in the hole. Consequently, the wall surface that defines the hole and the tongue can appropriately be held in contact with each other.

According to the tenth feature of the present invention, the intermediate tooth is positioned between the teeth, and is engaged by the intermediate engaging portion of the inner wall member. Therefore, the hand grip is locked on the inner wall surface in a highly stable manner.

According to the eleventh feature of the present invention, heights of the side surfaces, which are disposed adjacent to the flat surfaces that lie contiguous to the wall surfaces that define the through holes, are smaller than the heights of the flat surfaces. Therefore, when the locking hooks come into engagement with the engageable surfaces, even if the teeth slide against the side surfaces, any sliding resistance developed therebetween is relatively small. Thus, the locking hooks can easily be brought into locking engagement with the engageable surfaces.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A vehicle door according to a preferred embodiment of the present invention will be described in detail below with reference to the accompanying drawings. Hereinafter, various directions of the vehicle door may be defined and represented with respect to a vehicle that incorporates the vehicle door therein in the following manner. A direction of the vehicle door, which is aligned with a forward direction of the vehicle, is represented as an X1 direction. A direction of the vehicle door, which is aligned with a rearward direction of the vehicle, is represented as an X2 direction. A direction of the vehicle door, which is aligned with a transverse outward direction of the vehicle, is represented as a Y1 direction. A direction of the vehicle door, which is aligned with a transverse inward direction of the vehicle, is represented as a Y2 direction. A direction of the vehicle door, which is aligned with a vertical downward direction of the vehicle, is represented as a Z1 direction. A direction of the vehicle door, which is aligned with a vertical upward direction of the vehicle, is represented as a Z2 direction.

Figure 1:
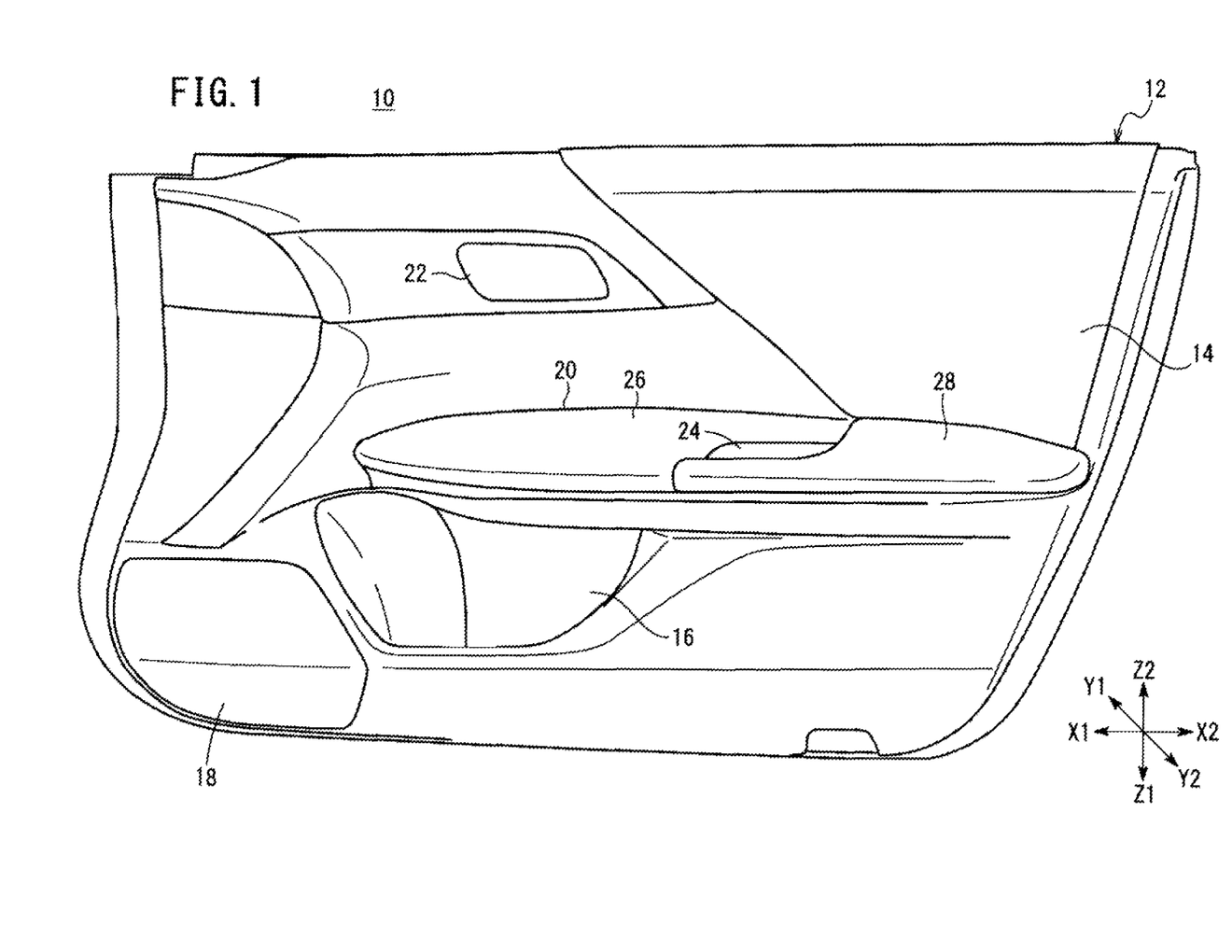
FIG. 1 is a perspective view of a vehicle door according to an embodiment of the present invention.

As shown in FIG. 1, a vehicle door 10 according to an embodiment of the present invention includes a door lining (door body) 12 mounted on a passenger compartment side of a vehicle door panel, and which is made of a synthetic resin material such as plastic or the like. The door lining 12 includes a base trim 14, a door pocket 16 disposed on a lower portion of the base trim 14, a speaker 18 disposed in front of the door pocket 16, a door arm rest 20 disposed above the door pocket 16, and a door knob 22 disposed above the door arm rest 20.

Figure 2:
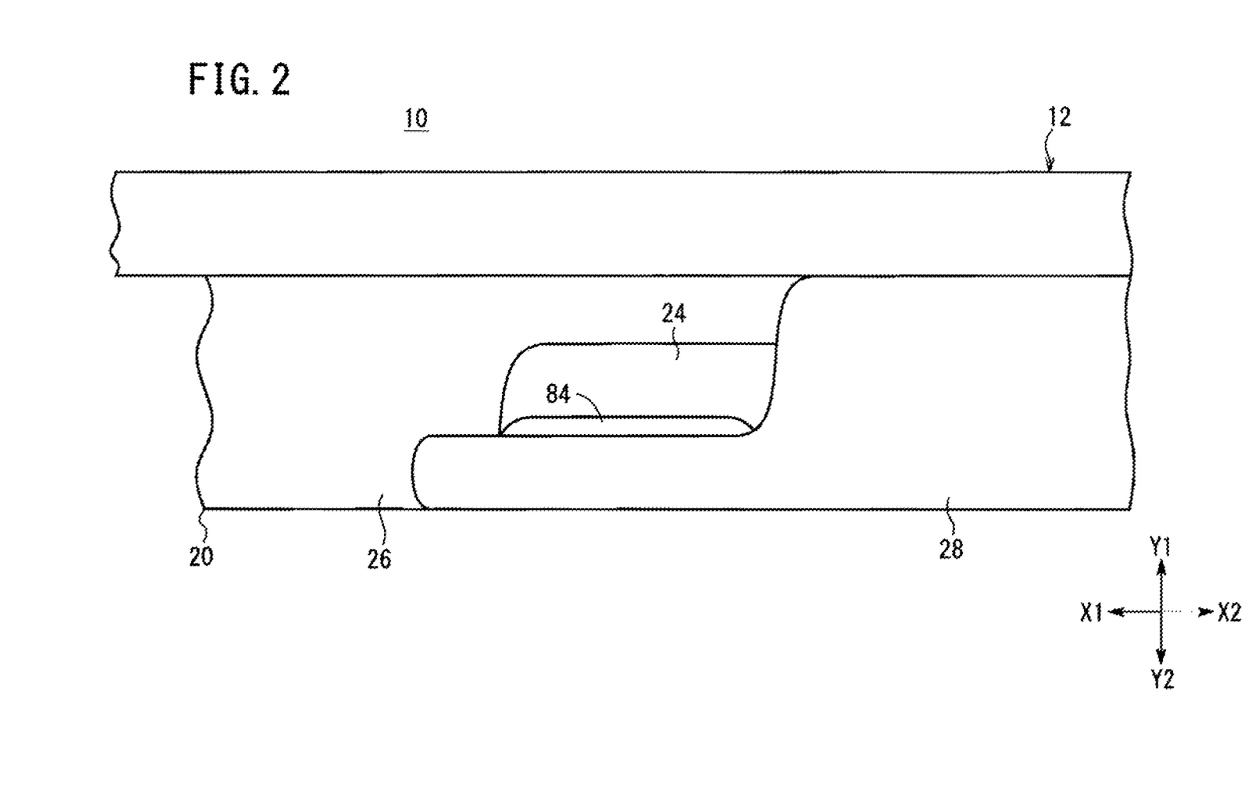
FIG. 2 is a fragmentary plan view of a door arm rest of the vehicle door shown in FIG. 1.

The door arm rest 20 extends in the longitudinal direction of the vehicle and projects from the base trim 14 in the form of a panel in a transverse inward direction of the vehicle, i.e., in the Y2 direction. The door arm rest 20 has an upwardly open pocket 24, a front cover (switch panel) 26 that extends forwardly in the X1 direction from the pocket 24 and in a transverse outward direction, i.e., in the Y1 direction, from the pocket 24, and a rear cover 28 that extends rearwardly in the X2 direction from the pocket 24 and in a transverse inward direction, i.e., in the Y2 direction, from the pocket 24 (see also FIG. 2).

Figure 3:
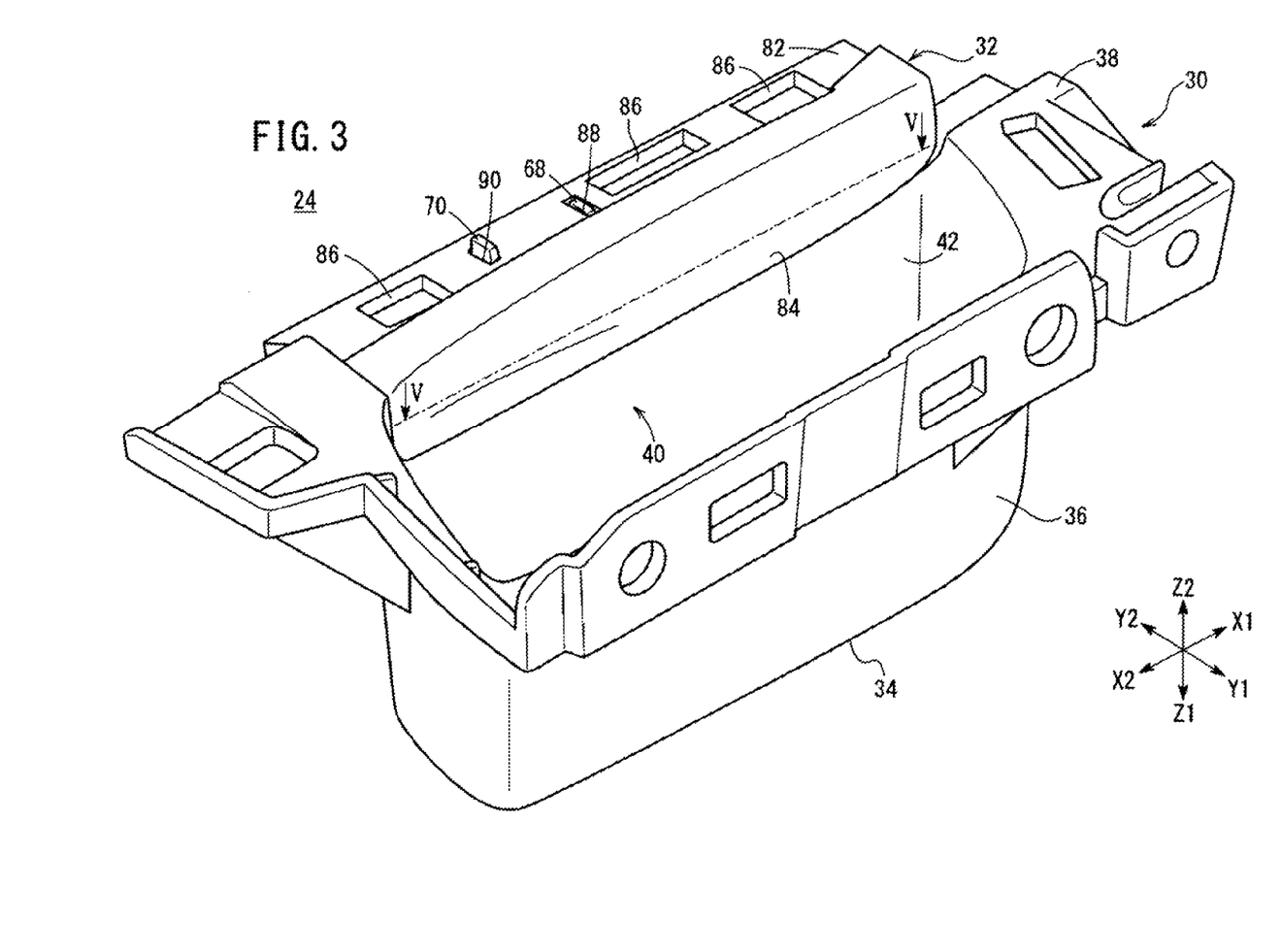
FIG. 3 is a perspective view of a pocket on the vehicle door shown in FIG. 1.
Figure 4:
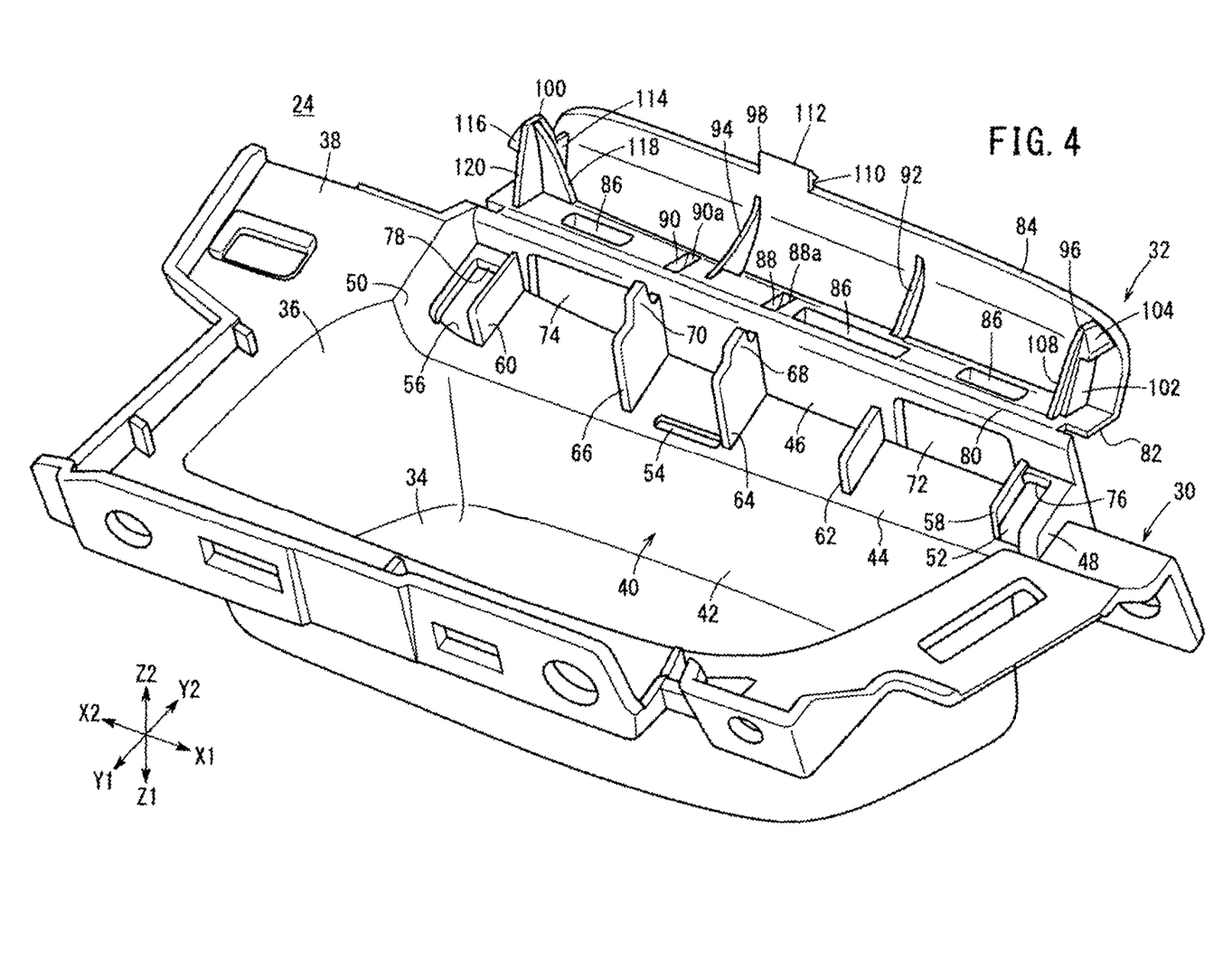
FIG. 4 is a perspective view of the pocket shown in FIG. 3, with a hand grip thereof being open.

As shown in FIGS. 3 and 4, the pocket 24 has a pocket body 30 and a hand grip 32, which is mounted on the pocket body 30. The pocket body 30 includes a bottom wall 34, which is quadrangularly shaped as viewed in plan, a side wall assembly 36 mounted on a peripheral edge of the bottom wall 34, and a flange 38 that extends outwardly from an upper end of the side wall assembly 36. The bottom wall 34 and the side wall assembly 36 jointly define a space in the pocket 24.

The side wall assembly 36 includes an inner wall member 40 that is displaceable in the Y2 direction. The inner wall member 40 includes a quadrangularly shaped first wall 42 that extends upwardly from the bottom wall 34, a second wall 44 that extends in the Y2 direction from an upper end of the first wall 42, and a third wall 46 that extends upwardly in the Z2 direction from a distal end of the second wall 44. The first wall 42 has a height, which is equal to or greater than one half the depth of the pocket body 30.

A block-shaped front wall 48 is mounted on a front end of the second wall 44, i.e., on an end thereof in the X1 direction, and a rear wall 50, which is disposed on a rear end of the second wall 44, i.e., on an end thereof in the X2 direction. The rear wall 50 is joined to the flange 38. The front wall 48 and the rear wall 50 both are joined to the third wall 46.

The second wall 44 has a front hole 52 defined therein, which functions as a through hole and is positioned at the front end of the second wall 44. The second wall 44 also has an intermediate hole 54 defined therein, which functions as a through hole and is positioned slightly rearwardly from the center of the second wall 44 in the longitudinal direction of the vehicle. The second wall 44 also has a rear hole 56 defined therein, which functions as a through hole and is positioned at the rear end of the second wall 44. Each of the front hole 52 and the rear hole 56 extends in the transverse direction of the vehicle. The intermediate hole 54 is positioned more closely to the first wall 42 than a center location of the second wall 44 in the transverse direction of the vehicle. The intermediate hole 54 extends in the longitudinal direction of the vehicle.

The second wall 44 supports on an upper surface thereof a front support wall 58, which is disposed adjacent to a rear edge of the front hole 52, and a rear support wall 60, which is disposed adjacent to a front edge of the rear hole 56. The front support wall 58 functions as a retainer for keeping a later-described front tooth 96 from being removed from the front hole 52. The front support wall 58 is in the form of a plate, which extends in the transverse direction of the vehicle and is joined to the third wall 46.

The front support wall 58 has a height, which is substantially equal to one half the height of the third wall 46. The front support wall 58 has a surface that faces in the X1 direction, and lies flush with and is joined to a surface, which faces in the X1 direction, of the wall surface that defines the front hole 52. The respective surfaces jointly serve as a flat surface 59 (see FIG. 6A). The wall surface that defines the front hole 52 also includes a surface, which serves as a side surface 61 (see FIG. 6B) and faces in the Y2 direction. The side surface 61 has a height h2, which represents the thickness of the second wall 44, and is smaller than the height h1 (see FIG. 6A) of the flat surface 59.

The rear support wall 60, which has the same structure as the front support wall 58, functions as a retainer for keeping a later-described rear tooth 100 from being removed from the rear hole 56. The rear support wall 60 is in the form of a plate, which extends in the transverse direction of the vehicle and is joined to the third wall 46.

The rear support wall 60 has a height, which is substantially equal to one half the height of the third wall 46. The rear support wall 60 has a surface that faces in the X2 direction, and which lies flush with and is joined to a surface, which faces in the X2 direction, of the wall surface that defines the rear hole 56. The respective surfaces jointly serve as a flat surface 63 (see FIG. 8A). The wall surface that defines the rear hole 56 also includes a surface, which serves as a side surface 65 (see FIG. 8B) and faces in the Y2 direction. The side surface 65 has a height h4, which represents the thickness of the second wall 44, and is smaller than the height h3 (see FIG. 8A) of the flat surface 63.

The second wall 44 also supports on an upper surface thereof, centrally in the longitudinal direction of the vehicle, a plurality of pressure bearing members 62, 64, 66 (three in the illustrated embodiment) for bearing a load applied in the transverse inward direction to the hand grip 32, which is mounted on the distal end of the third wall 46. More specifically, the pressure bearing members 62, 64, 66 are disposed in confronting relation to the hand grip 32. Each of the pressure bearing members 62, 64, 66 is in the form of a plate, which extends in the transverse direction of the vehicle and is joined to the third wall 46.

The pressure bearing member 62 is positioned forwardly of a center location of the second wall 44 in the longitudinal direction of the vehicle. A height of the pressure bearing member 62 is substantially equal to one half the height of the third wall 46. The pressure bearing member 64 is positioned substantially in the center of the second wall 44 in the longitudinal direction of the vehicle, i.e., slightly in front of the intermediate hole 54. The pressure bearing member 64 is slightly lower than the third wall 46. The pressure bearing member 66 is positioned slightly rearwardly of the intermediate hole 54. A height of the pressure bearing member 66 is substantially equal to the height of the pressure bearing member 64.

The pressure bearing member 64 includes an upwardly protruding tongue 68, which is disposed substantially centrally on the upper surface of the pressure bearing member 64 in the transverse direction of the vehicle. The pressure bearing member 66 includes an upwardly protruding tongue 70, which is disposed substantially centrally on the upper surface of the pressure bearing member 66 in the transverse direction of the vehicle. According to the present embodiment, the tongue 70 protrudes at a greater length than the tongue 68.

The third wall 46 includes two attachment holes 72, 74 through which the pocket 24 is attached to the door arm rest 20. The attachment hole 72 is positioned between the front support wall 58 and the pressure bearing member 62. The attachment hole 74 is positioned between the pressure bearing member 66 and the rear support wall 60.

The third wall 46 also has a front ledge 76, which connects the front wall 48 and the front support wall 58 to each other, and a rear ledge 78, which connects the rear support wall 60 and the rear wall 50 to each other. The third wall 46 is tapered, i.e., the wall thickness of a tapered end thereof is progressively reduced toward a distal end of the third wall 46 in the Z2 direction. The hand grip 32 is bendably connected to the tapered end of the third wall 46 by a bendable web 80. In other words, the bendable web 80 is disposed at a boundary between the third wall 46 and the hand grip 32.

The bendable web 80 has a length in the longitudinal direction of the vehicle, which is smaller than the entire length of the third wall 46. Therefore, the bendable web 80 can be bent easily under smaller forces than if the bendable web 80 were joined to the third wall 46 along the entire length thereof.

When the bendable web 80 is bent about 90° transversely outward in the Y1 direction with respect to the third wall 46, the hand grip 32 becomes closed as shown in FIG. 3 while remaining in engagement with the inner wall member 40 of the side wall assembly 36 of the pocket 24. In the closed condition, the hand grip 32 includes an upper cover 82 that covers the upper surface of the second wall 44, and a grip body 84 connected to the upper cover 82 and held in facing relation to the third wall 46.

The upper cover 82 has defined therein three rear cover attachment holes 86 for attaching the rear cover 28 (see FIG. 2), which covers the upper cover 82, and two holes 88, 90 for receiving the respective tongues 68, 70 therein. Rather than three cover attachment holes 86, the upper cover 82 may have any number of cover attachment holes 86, e.g., one, two, or four or more cover attachment holes 86.

When the hand grip 32 is closed, surfaces (engaging portions) 88a, 90a, which face transversely inward in the Y2 direction, of the wall surfaces, which define the respective holes 88, 90, are held in contact with the respective tongues 68, 70. Therefore, the tongues 68, 70 are capable of bearing transverse inward loads that may be applied to the grip body 84 of the hand grip 32.

When the hand grip 32 is closed, a substantially widthwise or vertically central region of the grip body is in a convex shape, or protrudes transversely outward in the Y1 direction. In other words, the grip body 84 has an arcuate transverse cross-sectional shape. Since the grip body 84 is of a convex shape, or protrudes transversely outward in the Y1 direction, a finger or fingers of a passenger in the vehicle can easily be placed on the grip body 84.

The hand grip 32 also includes a plurality of ribs 92, 94 (two in the illustrated embodiment) disposed on an inner surface of the grip body 84, and which are spaced at equal intervals along the longitudinal direction of the vehicle. The ribs 92, 94 serve to make the grip body 84 more rigid than if the grip body 84 were free of such ribs 92, 94.

Figure 5:
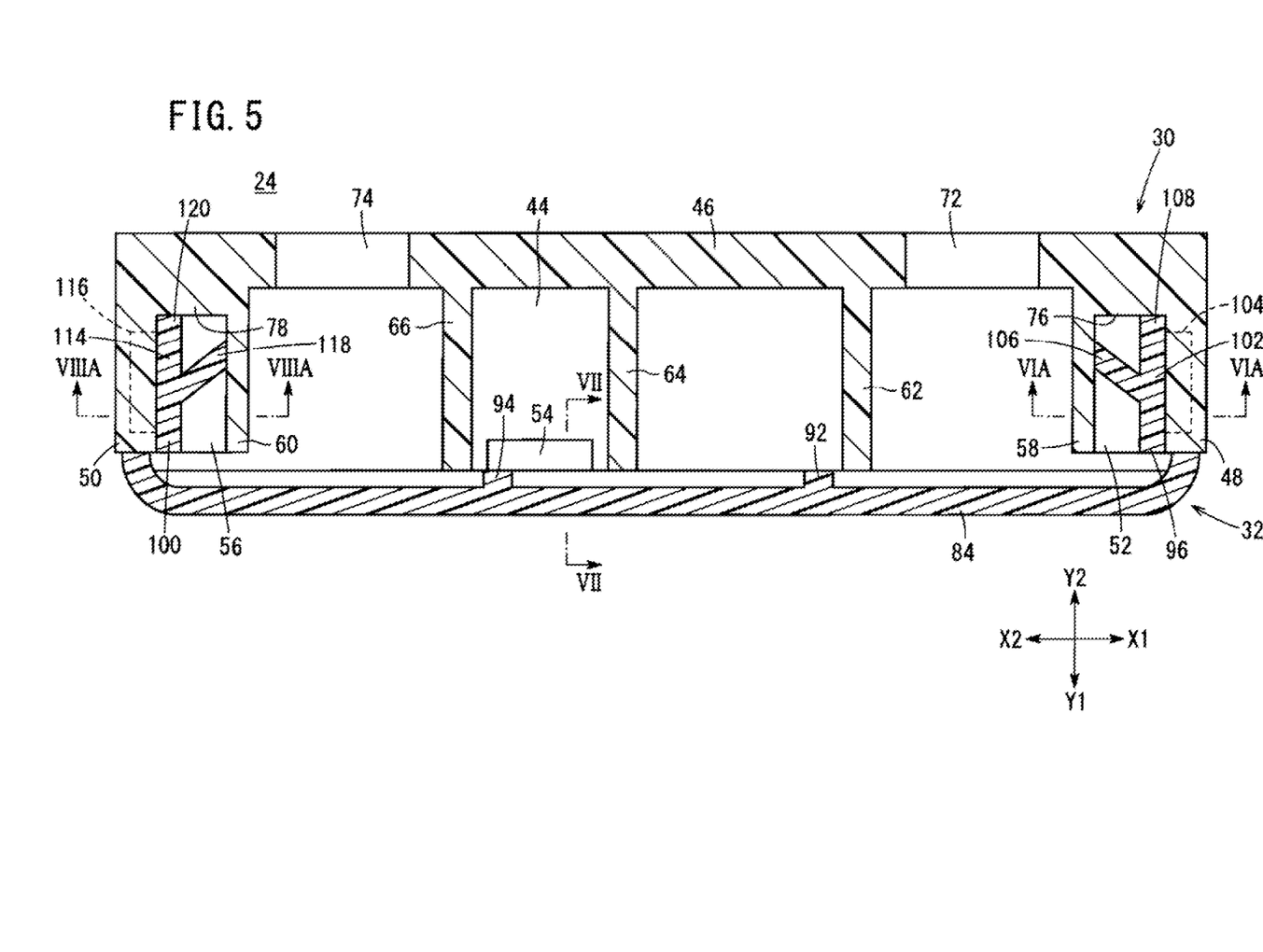
FIG. 5 is a cross-sectional view taken along line V-V of FIG. 3.

As shown in FIG. 5, when the hand grip 32 is closed, the grip body 84 is held in abutment against the pressure bearing members 62, 64, 66. The pressure bearing members 62, 64, 66 bear a load, which is applied to the grip body 84 in a transverse inward direction.

As shown in FIGS. 4 and 5, the hand grip 32 has, on an inner surface thereof, a front tooth 96, an intermediate tooth 98, and a rear tooth 100, which hold the hand grip 32 in locking engagement with the pocket body 30. The front tooth 96 includes a support 102, which projects from a front end of the upper cover 82, a locking hook 104, which extends forwardly in the X1 direction from the distal end of the support 102, and a plurality of ribs (protrusions) 106, 108 (two in the illustrated embodiment), which are mounted on the support 102.

The support 102 is joined to the grip body 84. The rib 106 projects in the X2 direction from a rear surface of the support 102, which also faces in the X2 direction. The rib 106, which is narrower than the support 102, extends from a proximal end of the support 102 to the distal end of the locking hook 104, and the rib 106 is slanted toward the third wall 46 in a direction toward the distal end of the locking hook 104. The rib 106 has a small length and projects toward the distal end of the locking hook 104. The rib 108 projects toward the third wall 46 from a side surface of the support 102, which confronts the third wall 46. The rib 108 extends from the proximal end to the distal end of the support 102, and has a small length that projects toward the distal end of the locking hook 104.

Figure 6A:
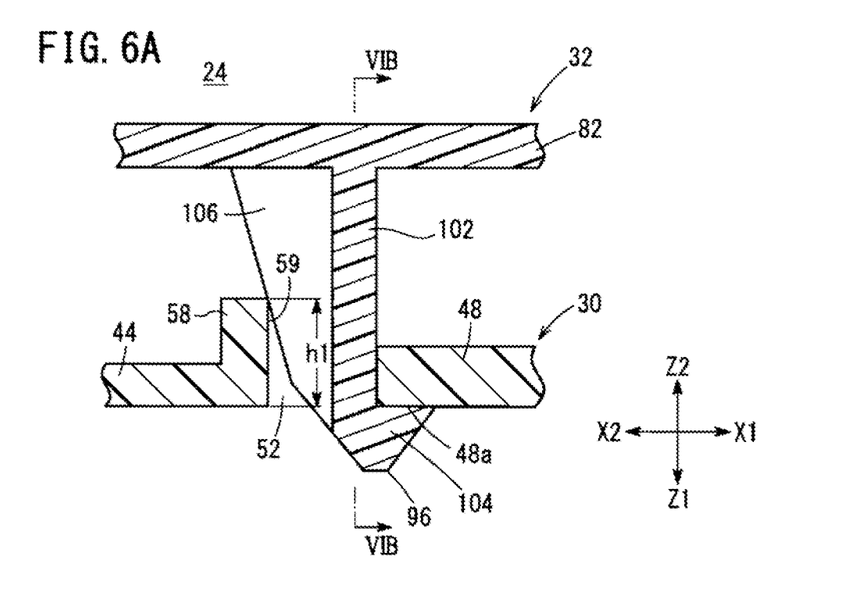
FIG. 6A is an enlarged cross-sectional view taken along line VIA-VIA of FIG. 5.
Figure 6B:
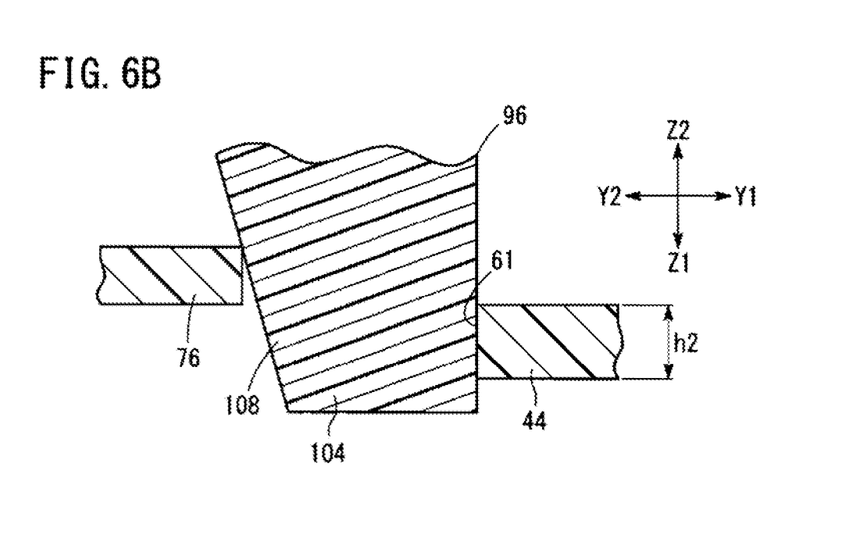
FIG. 6B is an enlarged cross-sectional view taken along line VIB-VIB of FIG. 6A.

As shown in FIG. 6A, when the support 102 is inserted in the front hole 52, the front tooth 96 locks a front portion of the hand grip 32 on the pocket body 30 with the locking hook 104 that engages with an engageable lower surface 48a of the front wall 48, which lies contiguous to a wall surface that defines the front hole 52. At this time, the rib 106 engages with the front support wall 58, thereby keeping the locking hook 104 from becoming dislodged from the lower surface 48a of the front wall 48, and also keeping the hand grip 32 from being displaced with respect to the inner wall member 40 in the longitudinal direction of the vehicle. The rib 108 engages with the front ledge 76, which bears a load applied to the grip body 84 (see FIG. 6B) in a transverse inward direction. Consequently, the load is suppressed from being concentrated on the bendable web 80.

However, while the locking hook 104 is in engagement with the lower surface 48a of the front wall 48, the rib 106 may be spaced from the front support wall 58 in readiness for contact and engagement therewith, and the rib 108 may also be spaced from the front ledge 76 in readiness for contact and engagement therewith. Such an alternative also is effective to suppress loads from being concentrated on the bendable web 80.

Figure 7:
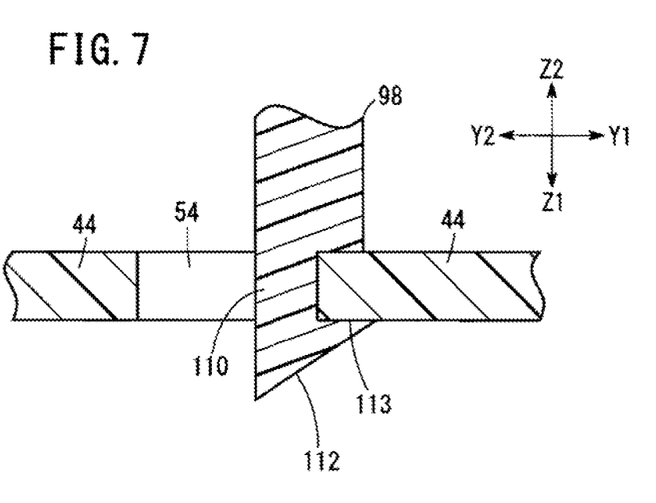
FIG. 7 is a an enlarged cross-sectional view taken along line VII-VII of FIG. 5.

The intermediate tooth 98 includes a support 110, which projects from the grip body 84 at a position located slightly rearward from the center of the grip body 84 in the longitudinal direction of the vehicle, and a locking hook 112, which is disposed on the distal end of the support 110 and extends from the support 110 in a direction away from the third wall 46. As shown in FIG. 7, when the support 110 is inserted in the intermediate hole 54 and the locking hook 112 comes into engagement with an engaging surface (intermediate engaging portion) 113 on the lower surface of the second wall 44, which lies contiguous to the wall surface that defines the intermediate hole 54, the intermediate tooth 98 serves to lock an intermediate portion of the hand grip 32 on the pocket body 30.

The rear tooth 100 is basically of the same structure as the front tooth 96. More specifically, the rear tooth 100 includes a support 114 that projects from a rear end of the upper cover 82, a locking hook 116 that extends outward rearwardly (in the X2 direction) from the distal end of the support 114, and a plurality of (two in the illustrated embodiment) ribs (protrusions) 118, 120, which are mounted on the support 114.

The support 114 is joined to the grip body 84. The rib 118 projects in the X1 direction from a rear surface, which also faces in the X1 direction, of the support 114. The rib 118, which is narrower than the support 114, extends from the proximal end of the support 114 to the distal end of the locking hook 116, and the rib 118 is slanted toward the third wall 46 in a direction toward the distal end of the locking hook 116. The rib 118 has a small projecting length toward the distal end of the locking hook 116. The rib 120 projects toward the third wall 46 from a side surface, which confronts the third wall 46 of the support 114. The rib 120 extends from the proximal end to the distal end of the support 114, and has a small projecting length toward the distal end of the locking hook 116.

Figure 8A:
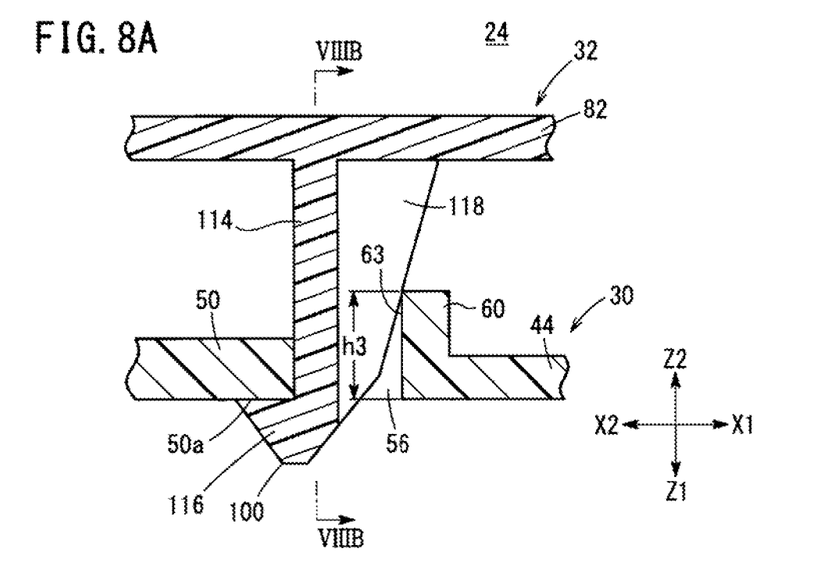
FIG. 8A is an enlarged cross-sectional view taken along line VIIIA-VIIIA of FIG. 5.
Figure 8B:
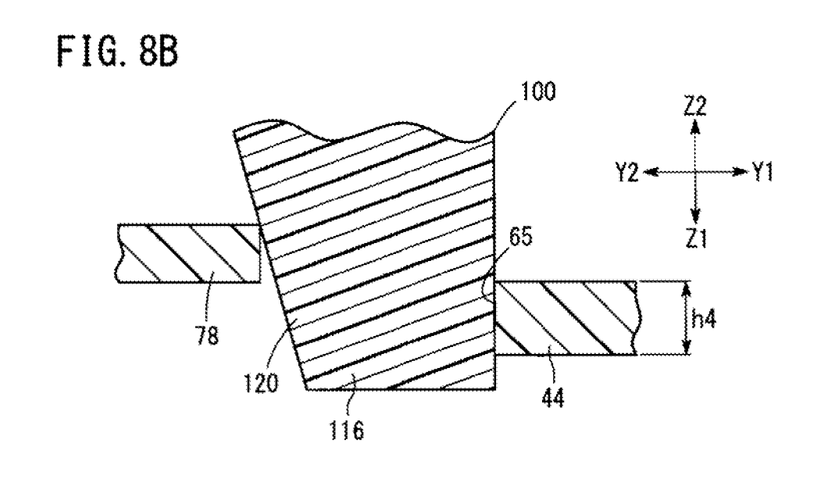
FIG. 8B is an enlarged cross-sectional view taken along line VIIIB-VIIIB of FIG. 8A.

As shown in FIG. 8A, when the support 114 is inserted in the rear hole 56, the rear tooth 100 serves to lock a rear portion of the hand grip 32 on the pocket body 30 by means of the locking hook 116, which engages with an engageable lower surface 50*a* of the rear wall 50 that lies contiguous to the wall surface that defines the rear hole 56. At this time, the rib 118 engages with the rear support wall 60, thereby keeping the locking hook 116 from becoming dislodged from the lower surface 50*a* of the rear wall 50, while also keeping the hand grip 32 from being displaced with respect to the inner wall member 40 in the longitudinal direction of the vehicle. Further, the rib 120 engages with the rear ledge 78, which bears a load applied transversely inward to the grip body 84 (see FIG. 8B). Consequently, the load is suppressed from being concentrated on the bendable web 80.

However, while the locking hook 116 engages with the lower surface 50*a* of the rear wall 50, the rib 120 may be spaced from the rear support wall 60 in readiness for contact and engagement therewith, and the rib 120 may also be spaced from the rear ledge 78 in readiness for contact engagement therewith. Such an alternative also is effective to suppress loads from being concentrated on the bendable web 80.

As described above, since the front support wall 58 is disposed on the upper surface of the second wall 44 for thereby keeping the front tooth 96 from being removed out of the front hole 52, the front tooth 96 is kept from becoming dislodged from the inner wall member 40, i.e., the pocket body 30.

Since the rear support wall 60 is disposed on the upper surface of the second wall 44 for thereby keeping the rear tooth 100 from being removed out of the rear hole 56, the rear tooth 100 is kept from becoming dislodged from the inner wall member 40, i.e., the pocket body 30. Consequently, the hand grip 32 remains locked in a stable condition on the inner wall member 40.

Inasmuch as the front tooth 96 is disposed on the front end of the hand grip 32, whereas the rear tooth 100 is disposed on the rear end of the hand grip 32, the hand grip 32 is locked on the inner wall member 40 in a highly stable manner.

According to the present embodiment, since the rib 106 on the back of the front tooth 96 engages with the front support wall 58, by means of a simple structure, the front tooth 96 is kept from being removed out of the front hole 52. Further, when the locking hook 104 comes into engagement with the lower surface 48*a* of the front wall 48, any sliding resistance developed between the front tooth 96 and the front support wall 58 is relatively small. Therefore, the locking hook 104 is easily brought into engagement with the lower surface 48*a* of the front wall 48.

Similarly, since the rib 118 on the back of the rear tooth 100 engages with the rear support wall 60, by means of a simple structure, the rear tooth 100 is kept from being removed out of the rear hole 56. Further, when the locking hook 116 comes into engagement with the lower surface 50*a* of the rear wall 50, any sliding resistance developed between the rear tooth 100 and the rear support wall 60 is relatively small. Therefore, the locking hook 116 is easily brought into engagement with the lower surface 50*a* of the rear wall 50.

According to the present embodiment, when the front tooth 96 comes into engagement with the front support wall 58 and the rear tooth 100 comes into engagement with the rear support wall 60, the hand grip 32 is kept from being displaced with respect to the inner wall member 40 in the longitudinal direction of the vehicle. Therefore, a load applied to the hand grip 32 in the longitudinal direction of the vehicle is suppressed from being concentrated on the bendable web 80, which is of relatively small rigidity. In other words, the front tooth 96 and the rear tooth 100 are effective to protect the bendable web 80.

Further, the front tooth 96 and the rear tooth 100 are disposed at regions (on opposite ends of the hand grip) that are not easily flexed when loads act in a transverse inward direction of the vehicle on a central region of the grip body 84 in the longitudinal direction of the vehicle, on which a finger or fingers of a passenger in the vehicle can be placed comparatively easily. Owing thereto, the front tooth 96 can advantageously be kept from being pulled out from the front hole 52, and similarly, the rear tooth 100 can advantageously be kept from being pulled out from the rear hole 56.

Furthermore, the locking hook 104 of the front tooth 96 extends outwardly in a frontward direction (i.e., toward one opposite side from a center portion of the hand grip 32 in the longitudinal direction of the vehicle), and therefore, the front tooth 96 can further be kept from being pulled out from the front hole 52.

Still further, the locking hook 116 of the rear tooth 100 extends outwardly in a rearward direction (i.e., toward another opposite side from a center portion of the hand grip 32 in the longitudinal direction of the vehicle), and therefore, the rear tooth 100 can further be kept from being pulled out from the rear hole 56.

According to the present embodiment, when the three pressure bearing members 62, 64, 66, which are disposed respectively on the upper surface of the second wall 44, are held against the grip body 84, the pressure bearing members 62, 64, 66 effectively bear a load applied in a transverse inward direction to the hand grip 32. The load is thus suppressed from being concentrated on the bendable web 80. In other words, the pressure bearing members 62, 64, 66 are effective to protect the bendable web 80.

Further, because the pressure bearing members 62, 64, 66 are provided at an intermediate portion of the inner wall member 40 in the longitudinal direction of the vehicle, compared to a situation in which such pressure bearing members 62, 64, 66 are not provided, the bending amount or amount of flexure of the hand grip 32 can be further suppressed. Accordingly, the front tooth 96 can effectively be kept from being pulled out from the front hole 52, and the rear tooth 100 can effectively be kept from being pulled out from the rear hole 56.

Furthermore, the tongue 68 is disposed on the upper surface of the pressure bearing member 64, and the tongue 70 is disposed on the upper surface of the pressure bearing member 66. The tongues 68, 70 are insertable respectively into the holes 88, 90 that are defined in the upper cover 82. The tongue 68 can contact the surface 88*a*, which faces transversely inward in the Y2 direction, of the wall surface that defines the hole 88, and the tongue 70 can contact the surface 90*a*, which faces transversely inward in the Y1 direction, of the wall surface that defines the hole 90. Thus, the respective tongues 68, 70 are effective to suppress a transverse inward load from being concentrated on the bendable web 80, thereby protecting the bendable web 80 efficiently.

Furthermore, since the two tongues 68, 70 and the two holes 88, 90 are positioned between the front tooth 96 and the rear tooth 100, the bendable web 80 is protected in a highly efficient manner.

According to the present embodiment, since the tongues 68, 70 are inserted in the respective holes 88, 90 when the hand grip 32 is closed, a worker can visually confirm the positional relationship between the holes 88, 90 and the tongues 68, 70, i.e., whether the tongues 68, 70 have been inserted in proper positions in the holes 88, 90, during a process of manufacturing the vehicle door 10 or the pocket 24. Consequently, the tongue 68 and the surface 88*a* that defines the hole 88 can be held in contact with each other appropriately, and the tongue 70 and the surface 90a that defines the hole 90 can be held in contact with each other appropriately.

The intermediate tooth 98 is disposed between the front tooth 96 and the rear tooth 100, and the intermediate tooth 98 is inserted through the intermediate hole 54 such that the locking hook 112 engages with the lower surface, i.e., the engaging surface 113, on the lower surface of the second wall 44. Accordingly, the hand grip 32 is held in engagement with the inner wall member 40 in a highly stable manner.

According to the present embodiment, the height h2 of the side surface 61, which is disposed adjacent to the flat surface 59 that lies contiguous to the front support wall 58 of the wall surface that defines the front hole 52, is smaller than the height h1 of the flat surface 59. Therefore, when the locking hook 104 of the front tooth 96 comes into engagement with the lower surface 48a of the front wall 48, even if the front tooth 96 slides against the side surface 61, any sliding resistance therebetween is relatively small. Therefore, the locking hook 104 can easily be brought into locking engagement with the lower surface 48a of the front wall 48.

Likewise, the height h4 of the side surface 65, which is disposed adjacent to the flat surface 63 that lies contiguous to the rear support wall 60 of the wall surface that defines the rear hole 56, is smaller than the height h3 of the flat surface 63. Therefore, when the locking hook 116 of the rear tooth 100 comes into engagement with the lower surface 50a of the rear wall 50, even if the rear tooth 100 slides against the side surface 65, any sliding resistance therebetween is relatively small. Therefore, the locking hook 116 can easily be brought into locking engagement with the lower surface 50a of the rear wall 50.

The present invention is not limited to the illustrated embodiment. The holes 88, 90 may be replaced with respective recesses (engaging portions), which are defined in an inner surface of the upper cover 82, and allow the respective tongues 68, 70 to engage therewith. The tongues 68, 70, which engage with the recesses in this manner, also are effective to suppress a transverse inward load that acts on the hand grip 32 from being concentrated on the bendable web 80. Thus, the bendable web 80 is protected efficiently.

Although a certain preferred embodiment of the present invention has been shown and described in detail, it should be understood that various changes and modifications may be made to the embodiment without departing from the scope of the invention as set forth in the appended claims.

What is claimed is:

1. A vehicle door for use on a vehicle, comprising:
an upwardly open pocket that opens upwardly on a passenger compartment side of a door body;
the upwardly open pocket comprising:
a side wall assembly defining a space in the upwardly open pocket, and having an inner wall member disposed in a transverse inward direction of the vehicle;
a hand grip bendable with respect to the inner wall member by a bendable web;
a pair of teeth having a pair of supports disposed respectively on the hand grip and extending through respective through holes defined in the inner wall member when the hand grip is closed with the bendable web in a bent state, and a pair of locking hooks extending respectively from the supports in directions transverse to directions in which the supports extend, the locking hooks being engageable with engagement surfaces contiguous to wall surfaces that define the through holes, respectively; and a pair of retainers mounted on the inner wall member for keeping the teeth from being removed out of the through holes,
wherein the retainers abut against respective rear surfaces of the teeth, which face away from the directions in which the locking hooks extend.

2. The vehicle door according to claim 1, wherein the teeth are disposed respectively on opposite ends of the hand grip in a longitudinal direction of the vehicle; and
the through holes and the retainers are disposed in association with the teeth.

3. The vehicle door according to claim 2, wherein the hand grip has an intermediate tooth positioned between the teeth; and
the inner wall member has an intermediate engaging portion for engagement with the intermediate tooth.

4. The vehicle door according to claim 1, wherein the teeth have respective protrusions that project from respective rear surfaces of the supports, and which engage respectively with the retainers, the protrusions being narrower than the supports.

5. The vehicle door according to claim 1, wherein:
the teeth are disposed on respective front and rear ends of the hand grip and are effective to keep the hand grip from being displaced with respect to the inner wall member in a longitudinal direction of the vehicle; and
the locking hooks extend toward opposite sides from a center portion of the hand grip in the longitudinal direction of the vehicle.

6. The vehicle door according to claim 1, wherein the through holes are defined in an upper surface of the inner wall member;
the teeth are disposed in positions facing the upper surface of the inner wall member;
the retainers have respective surfaces to be abutted respectively against the teeth, and which are contiguous to wall surfaces defining the through holes, thereby providing flat surfaces, respectively; and
the wall surfaces defining the through holes include side surfaces adjacent to the flat surfaces, the side surfaces having heights that are smaller than heights of the flat surfaces.

7. A vehicle door for use on a vehicle, comprising:
an upwardly open pocket that opens upwardly on a passenger compartment side of a door body;
the upwardly open pocket comprising:
a side wall assembly defining a space in the upwardly open pocket, and having an inner wall member disposed in a transverse inward direction of the vehicle;
a hand grip bendable with respect to the inner wall member by a bendable web;
a pair of teeth having a pair of supports disposed respectively on the hand grip and extending through respective through holes defined in the inner wall member when the hand grip is closed with the bendable web in a bent state, and a pair of locking hooks extending respectively from the supports in directions transverse to directions in which the supports extend, the locking hooks being engageable with engagement surfaces contiguous to wall surfaces that define the through holes, respectively; and
a pair of retainers mounted on the inner wall member for keeping the teeth from being removed out of the through holes,
wherein the inner wall member has, in a central region thereof in a longitudinal direction of the vehicle, a pressure bearing member, which faces toward the hand grip and bears a load applied to the hand grip in the transverse inward direction of the vehicle, the pressure bearing member being in the form of a plate and extending in the transverse inward direction of the vehicle.

8. The vehicle door according to claim 7, wherein the pressure bearing member comprises a plurality of pressure bearing members disposed on an upper surface of the inner wall member;
- at least one of the pressure bearing members has a tongue projecting upwardly on an upper surface thereof; and
- the hand grip has an engaging portion for engaging the tongue, the engaging portion being disposed in a position facing toward the upper surface of the inner wall member.

9. The vehicle door according to claim 8, wherein the teeth are disposed on respective opposite ends of the hand grip in the longitudinal direction of the vehicle;
- the through holes and the retainers are disposed in association with the teeth; and
- the tongue and the engaging portion are positioned between the teeth.

10. The vehicle door according to claim 8, wherein the engaging portion comprises a surface that defines a hole; and
- the tongue is inserted in the hole.

\* \* \* \* \*